US012603553B2

(12) United States Patent
Ikemi et al.

(10) Patent No.: US 12,603,553 B2
(45) Date of Patent: Apr. 14, 2026

(54) METHOD OF MANUFACTURING COIL, COIL, AND ELECTRIC MOTOR

(71) Applicant: MITSUBISHI HEAVY INDUSTRIES, LTD., Tokyo (JP)

(72) Inventors: Takeshi Ikemi, Tokyo (JP); Akiko Kasami, Tokyo (JP); Takashi Arai, Tokyo (JP); Satoshi Nakatsuka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 371 days.

(21) Appl. No.: 18/118,494

(22) Filed: Mar. 7, 2023

(65) Prior Publication Data

US 2023/0327530 A1 Oct. 12, 2023

(30) Foreign Application Priority Data

Mar. 22, 2022 (JP) ................................. 2022-045916

(51) Int. Cl.
| | |
|---|---|
| *H02K 15/043* | (2025.01) |
| *H02K 1/16* | (2006.01) |
| *H02K 1/22* | (2006.01) |
| *H02K 3/12* | (2006.01) |
| *H02K 3/48* | (2006.01) |

(52) U.S. Cl.
CPC ............. *H02K 15/043* (2025.01); *H02K 1/16* (2013.01); *H02K 1/22* (2013.01); *H02K 3/12* (2013.01); *H02K 3/48* (2013.01)

(58) Field of Classification Search
CPC .. H02K 3/02; H02K 3/04; H02K 3/18; H02K 3/30; H02K 3/32; H02K 3/52; H02K 3/522
See application file for complete search history.

(56) References Cited

U.S. PATENT DOCUMENTS

| | | | |
|---|---|---|---|
| 2002/0053853 A1* | 5/2002 | Nishimura ............... | H02K 3/12 310/201 |
| 2015/0288262 A1* | 10/2015 | Tsuiki ...................... | H02K 3/12 29/605 |
| 2021/0021167 A1 | 1/2021 | Maeda et al. | |
| 2021/0328485 A1 | 10/2021 | Balazs et al. | |
| 2024/0250587 A1* | 7/2024 | Oettel .................... | H02K 15/24 |

FOREIGN PATENT DOCUMENTS

| | | |
|---|---|---|
| CN | 104348314 A | 2/2015 |
| JP | 11-98744 A | 4/1999 |
| JP | 2005-51846 A | 2/2005 |

(Continued)

*Primary Examiner* — Oluseye Iwarere
*Assistant Examiner* — Minki Chang
(74) *Attorney, Agent, or Firm* — Birch, Stewart, Kolasch & Birch, LLP

(57) ABSTRACT

A method of manufacturing a coil includes: a step of forming a winding portion extending twisting around an axis along a direction of the axis, the winding portion including a portion in an extending direction of the winding portion, the portion being a deformation allowing portion having a lower rigidity than the other portion; a step of forming an insulation film on the winding portion in the extending direction of the winding portion; and a step of compressing the winding portion on which the insulation film is formed, in the direction of the axis.

13 Claims, 10 Drawing Sheets

(56)  References Cited

FOREIGN PATENT DOCUMENTS

| JP | 2016-39662 A | 3/2016 |
| JP | 2020-171096 A | 10/2020 |
| WO | WO2014/065026 A1 | 5/2014 |
| WO | WO2019/203076 A1 | 10/2019 |
| WO | WO2020/071532 A1 | 4/2020 |

* cited by examiner

METHOD OF MANUFACTURING COIL, COIL, AND ELECTRIC MOTOR

CROSS-REFERENCE TO RELATED APPLICATIONS

This application claims the benefit of priority to Japanese Patent Application Number 2022-045916 filed on Mar. 22, 2022. The entire contents of the above-identified application are hereby incorporated by reference.

TECHNICAL FIELD

The disclosure relates to a method of manufacturing a coil, a coil, and an electric motor.

RELATED ART

In recent years, a technique of forming a coil by a three-dimensional additive manufacturing apparatus has been proposed. According to the technique disclosed in JP 2016-39662 A, a conductor constituting a coil and an insulation layer covering the outside of the conductor can be integrally formed by three-dimensional additive manufacturing.

SUMMARY

However, when a conductor such as copper and an insulation layer such as ceramic are simultaneously formed, it is difficult to perform stable forming because physical property values of these materials are significantly different from each other. Then, increase in the thickness of the insulation layer is required for stable forming. As a result, there is a problem that the space factor of the coil is decreased.

The disclosure has been made to solve the above problem, and an object of the disclosure is to provide a method of manufacturing a coil having a larger space factor, a coil having a larger space factor, and an electric motor including a coil having a larger space factor.

In order to solve the problem described above, a method of manufacturing a coil according to the disclosure includes: a step of forming a winding portion extending twisting around an axis along a direction of the axis, the winding portion including a portion in an extending direction of the winding portion, the portion being a deformation allowing portion having a lower rigidity than the other portion; a step of forming an insulation film on the winding portion in the extending direction of the winding portion; and a step of compressing the winding portion on which the insulation film is formed, in the direction of the axis.

A coil according to the disclosure includes: a winding portion having an annular shape centered on an axis, the winding portion extending toward an inner periphery side along a circumferential direction of the axis; an insulation film covering the winding portion from outside; and a deformation allowing portion formed at a portion of the winding portion in an extending direction of the winding portion and having a lower rigidity than the other portion.

An electric motor according to the disclosure includes a rotor configured to rotate about a central axis and a stator covering the rotor from an outer periphery side of the rotor. The stator includes: a stator core including a yoke having an annular shape centered on the central axis, and a plurality of teeth protruding from an inside surface of the yoke and arranged at intervals in a circumferential direction; and a coil attached covering outside surfaces of the teeth.

According to the disclosure, a method of manufacturing a coil having a larger space factor, a coil having a larger space factor, and an electric motor including a coil having a larger space factor can be provided.

BRIEF DESCRIPTION OF DRAWINGS

The disclosure will be described with reference to the accompanying drawings, wherein like numbers reference like elements.

DESCRIPTION OF EMBODIMENTS

Hereinafter, an electric motor 1, a coil 22, and a method of manufacturing the coil 22 according to an embodiment of the disclosure will be described with reference to FIGS. 1 to 7.

Configuration of Electric Motor

Figure 1:
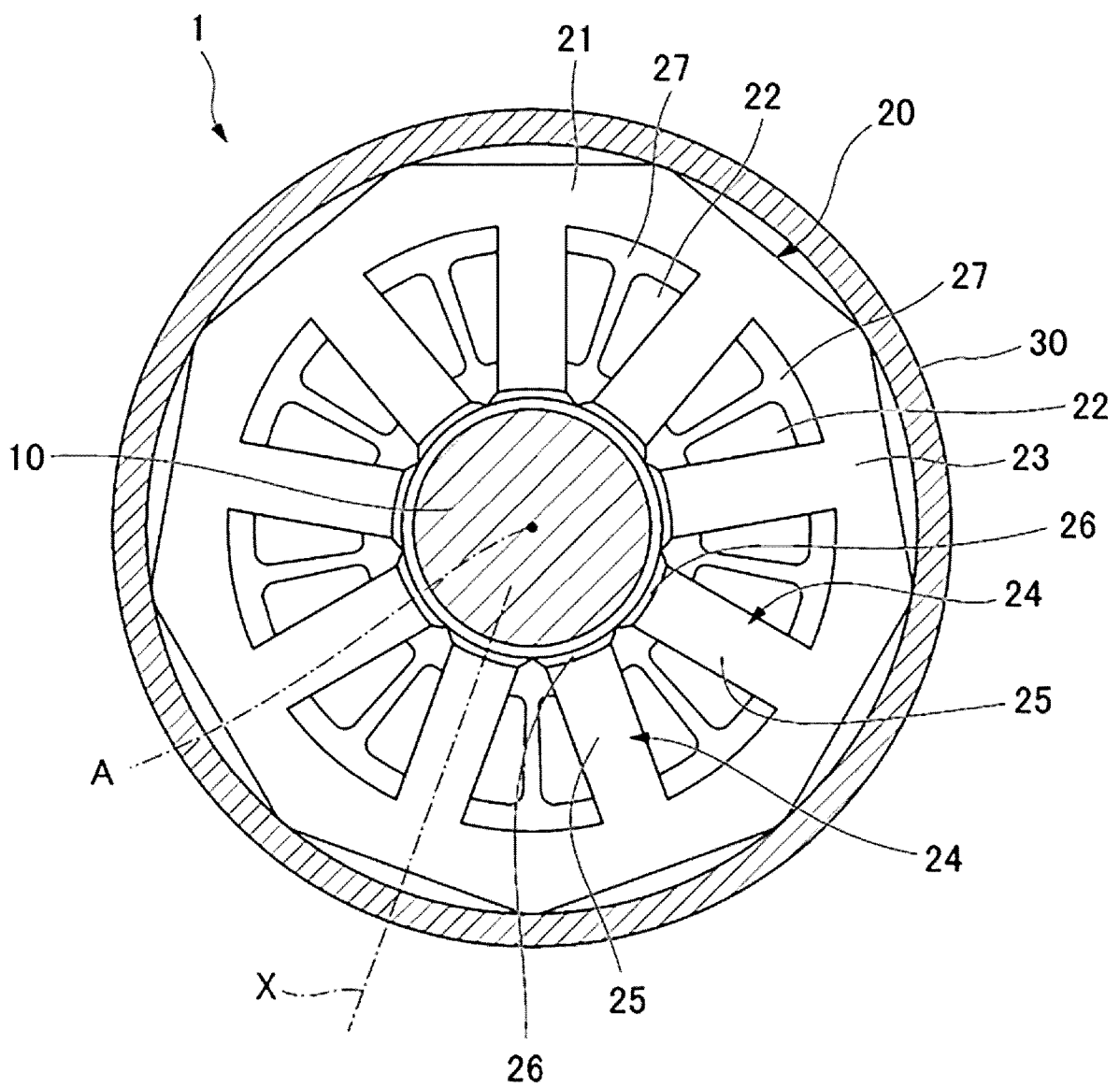
FIG. 1 is a cross-sectional view illustrating a configuration of an electric motor according to an embodiment of the disclosure.

As illustrated in FIG. 1, the electric motor 1 includes a rotor 10, a stator 20, and a housing 30. The rotor 10 has a cylindrical shape centered on a central axis A. The rotor 10 includes permanent magnets (not illustrated). An axial end of the rotor 10 is supported by a bearing or the like so as to rotate about the central axis A.

The stator 20 covers the rotor 10 from the outer periphery side. The stator 20 includes a stator core 21 and the coil 22. The stator core 21 includes a yoke 23 and a tooth 24. The yoke 23 has an annular shape centered on the central axis A. A plurality of teeth 24 protrudes inward in a radial direction from the inside surface of the yoke 23, and is arranged at intervals in a circumferential direction. In the present embodiment, for example, nine teeth 24 are disposed, but the number of teeth 24 may be 8 or less, or may be 10 or more.

The tooth 24 includes a tooth main body 25 and a flange portion 26. The tooth main body 25 extends in the radial direction from the inside surface of the yoke 23. The dimension in the circumferential direction (that is, a width dimension) of the tooth main body 25 is constant over the entire region in the radial direction. The flange portion 26 is disposed at an end portion (tip) of the tooth main body 25 on an inner side in the radial direction. That is, the flange portion 26 protrudes from the tip of the tooth main body 25 on both sides in the circumferential direction. The flange portion 26 is disposed so as to prevent the coil 22 attached to the tooth main body 25 from being detached.

A space between a pair of teeth 24 adjacent to each other in the circumferential direction is referred to as a slot 27. The coil 22 is disposed in the slot 27. A volume occupied by the coil 22 in the slot 27 may be referred to as a space factor.

The coil 22 is formed by winding a wire material for the coil 22, which is made of a conductive material such as copper, around each tooth main body 25 a plurality of times. When current is supplied to the coil 22, an electromagnetic force is generated by a magnetic field formed between the permanent magnets of the rotor 10 and the coil 22 of the stator 20, and the rotor 10 is driven so as to rotate about the central axis A. The rotation of the rotor 10 is taken out from the axial end and used for various purposes.

The housing 30 has a tubular shape centered on the central axis A so as to cover the stator 20 from the outer periphery side. For example, the stator 20 is secured to the inside surface of the housing 30 by interference fitting.

Configuration of Coil

Figure 2:
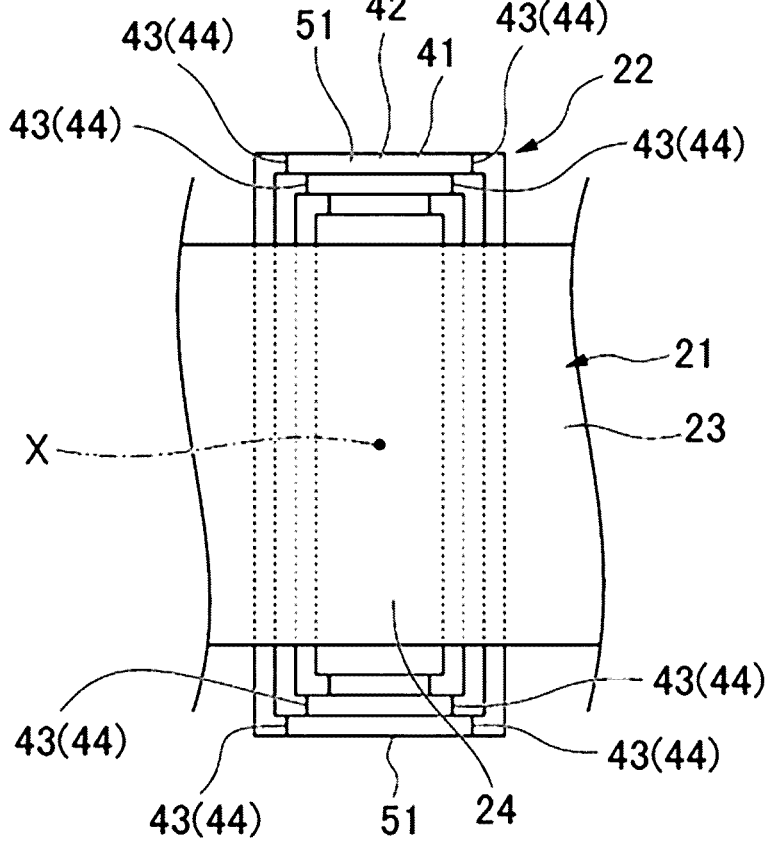
FIG. 2 is a view of a stator according to an embodiment of the disclosure as viewed from a radial direction.
Figure 6:
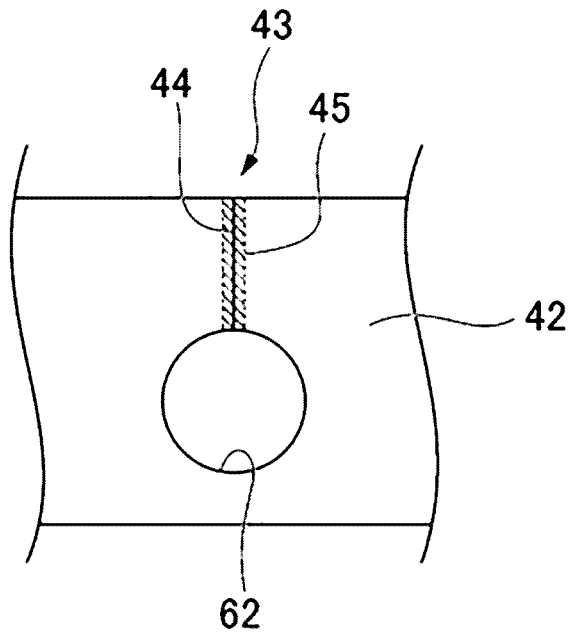
FIG. 6 is an enlarged view of a main portion of a coil according to an embodiment of the disclosure.

As illustrated in FIG. 2 or FIG. 6, the coil 22 includes a winding portion 41 and an insulation film 42 covering the surface of the winding portion 41. The winding portion 41 has a rectangular annular shape centered on an axis X extending in a radial direction with respect to the central axis A described above. The winding portion 41 has a spiral shape such that an outer dimension of the winding portion 41 as viewed in the direction of the axis X gradually decreases along a circumferential direction with respect to the axis X. The winding portion 41 is attached to the periphery of the tooth main body 25. The winding portion 41 is formed of a conductive material such as copper.

Further, as illustrated in FIG. 6, a deformation allowing portion 43 is formed at the winding portion 41. The deformation allowing portion 43 is a portion having a lower rigidity than the other portion. In the present embodiment, as the deformation allowing portion 43, a notch 44 is formed so as to extend in the direction of the axis X from a surface of the winding portion 41 facing the direction of the axis X. A conductive material 45 (a paste or the like) is applied to the inner surfaces of the notch 44. Further, an opening 62 having a circular shape is formed at an end portion inside the notch 44. The opening 62 will be described later.

As illustrated in FIG. 2, the deformation allowing portion 43 is formed at a coil end portion 51 that is a portion not overlapping with the tooth main body 25 in the coil 22 when viewed from the direction of the axis X (that is, when viewed in the radial direction with respect to the central axis A). In other words, the deformation allowing portion 43 is not formed at a portion overlapping with the tooth main body 25 in the coil 22.

Method of Manufacturing Coil

Figure 7:
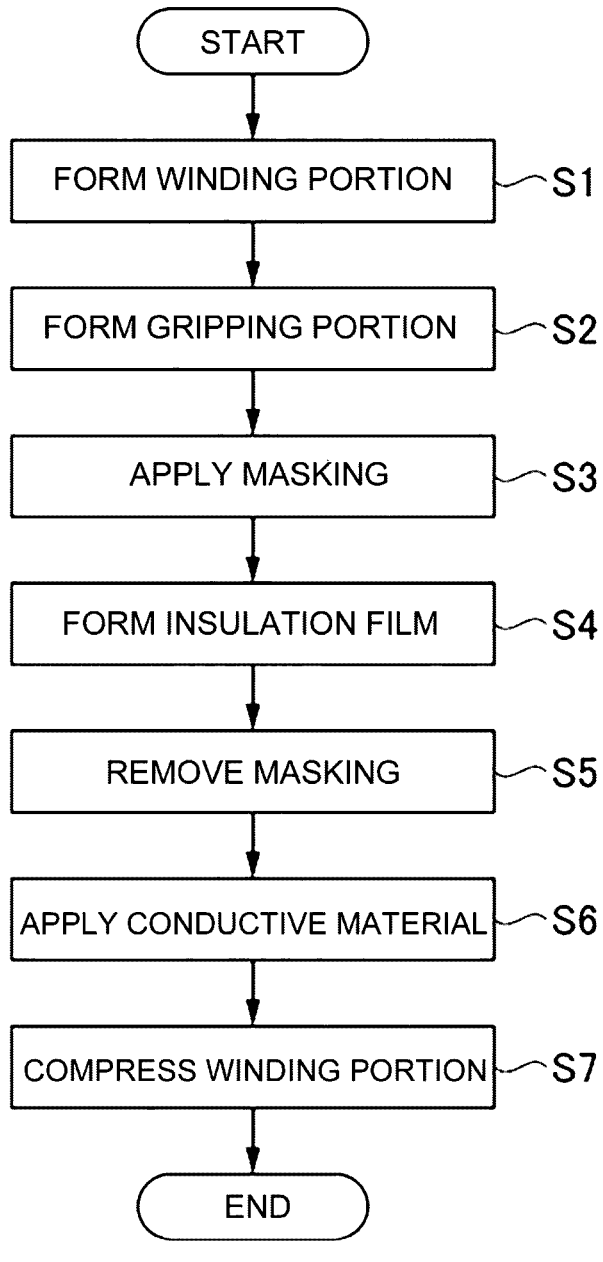
FIG. 7 is a flowchart illustrating each process of a method of manufacturing a coil according to an embodiment of the disclosure.

Next, a method of manufacturing the coil 22 will be described with reference to FIGS. 3 to 7. As illustrated in FIG. 7, the method of manufacturing includes a step S1 of forming the winding portion 41, a step S2 of forming a gripping portion 91, a step S3 of applying a masking, a step S4 of forming the insulation film 42, a step S5 of removing the masking, a step S6 of applying the conductive material 45, and a step S7 of compressing the winding portion 41.

Figure 3:
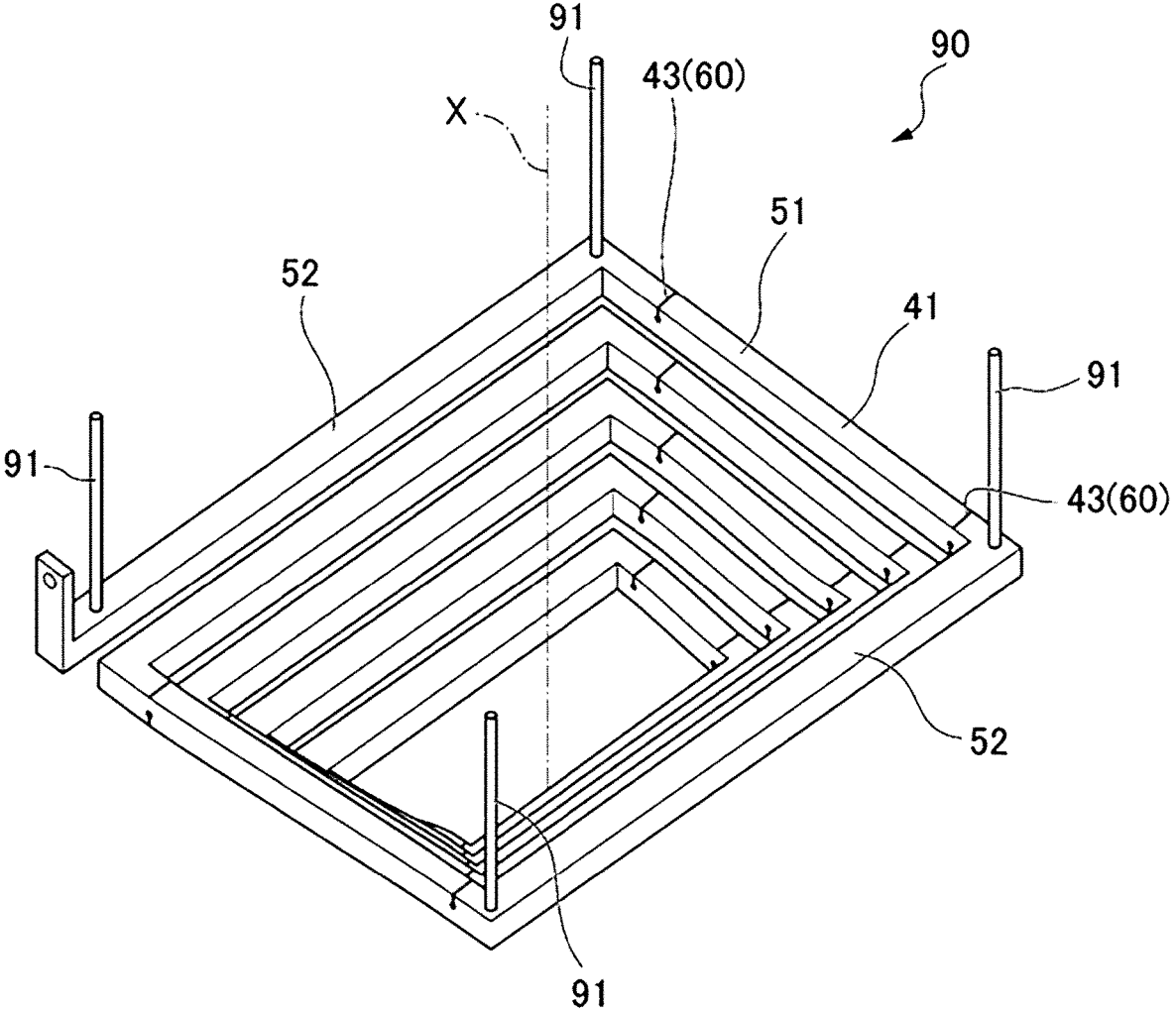
FIG. 3 is a perspective view illustrating a configuration of an intermediate coil body according to an embodiment of the disclosure.

In the step S1 of forming the winding portion 41 and the step S2 of forming the gripping portion 91, an intermediate coil body 90 as illustrated in FIG. 3 is formed. The intermediate coil body 90 includes the winding portion 41, the gripping portion 91, and the deformation allowing portion 43. The winding portion 41 has a shape such that the winding portion 41 of the coil 22 described above is stretched in the direction of the axis X. In other words, the winding portion 41 in the intermediate coil body 90 has a helical shape extending twisting around the axis X along the direction of the axis X. In addition, the opening area of an annular portion formed of the winding portion 41 gradually decreases from one side in the direction of the axis X toward the other side.

One gripping portion 91 is disposed at each of the four corners of the winding portion 41 forming a rectangular shape. The gripping portion 91 has a rod-like shape protruding from the winding portion 41 in the direction of the axis X. The gripping portion 91 is provided so as to be gripped by a worker by hand or with a tool in a step of compressing the winding portion 41 to be described later.

In a region (coil end portion 51) of the winding portion 41 corresponding to the above-described end portion of the coil 22, the winding portion 41 extends so as to be inclined with respect to the axis X from one side in the direction of the axis X toward the other side along the extending direction of the winding portion 41. A winding portion main body 52 is connected to each of the both ends of the coil end portion 51. The winding portion main body 52 extends in a plane orthogonal to the axis X.

Figure 4:
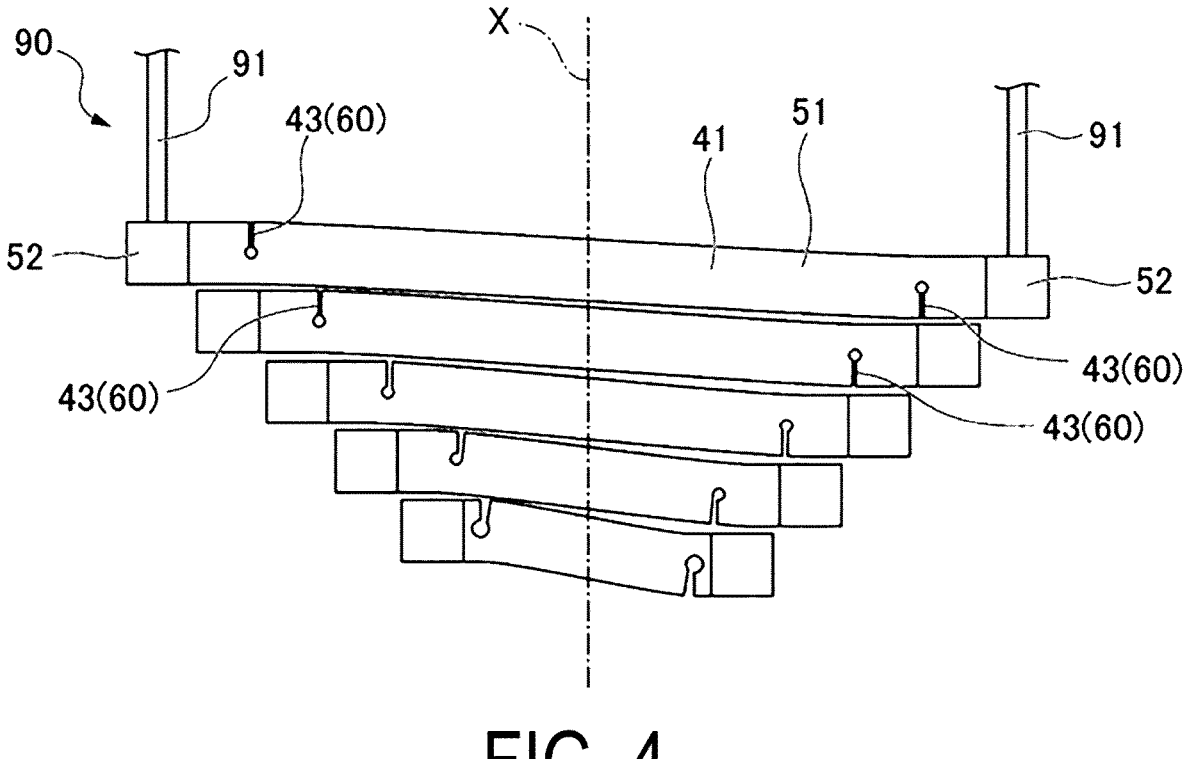
FIG. 4 is a side view of an intermediate coil body according to an embodiment of the disclosure.

As illustrated in FIG. 4, in the winding portion 41, a groove 60 is formed in each of the end faces facing the direction of the axis X as the deformation allowing portion 43. More specifically, one groove 60 is formed in each of the boundaries between the coil end portion 51 and the winding portion main bodies 52. The groove 60 is formed in each end face of the coil end portion 51 on a side in which an angle formed between the coil end portion 51 inclined and the winding portion main body 52 is larger than 180° in the boundary between the coil end portion 51 and the winding portion main body 52. That is, the groove 60 is formed on a side having a reflex angle among two angles formed between the coil end portion 51 and the winding portion main body 52.

Figure 5:
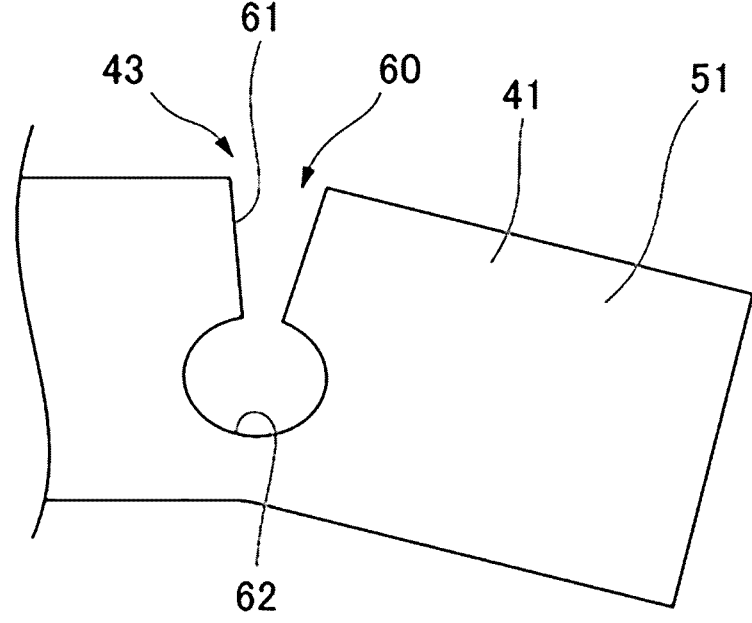
FIG. 5 is an enlarged view of a main portion of an intermediate coil body according to an embodiment of the disclosure.

As illustrated in FIG. 5, the groove 60 includes a groove main body 61 having a substantially V-shape in which spacing between inner surfaces gradually decreases along the direction of the axis X, and the opening 62 disposed at a bottom portion of the groove main body 61. The opening 62 is provided so as to avoid stress concentration at the bottom portion of the groove main body 61. Depending on the type of material of the coil 22 and the dimensions of the coil 22, the opening 62 need not be formed. When the deformation allowing portion 43 described above is formed, the deformation allowing portion 43 is preferentially deformed with ease because the deformation allowing portion 43 has a lower rigidity than the other portion.

Preferably, the winding portion 41 and the gripping portion 91 are integrally formed by, for example, three-dimensional additive manufacturing. The three-dimensional additive manufacturing is a manufacturing method in which a powder metal material is melted by high-power laser irradiation and then cured to obtain a layer having a predetermined shape, and this process is performed for a plurality of continuous layers. Note that the winding portion 41 and the gripping portion 91 can be formed in another method without using three-dimensional additive manufacturing.

Next, the step S3 of applying a masking is performed. In the step S3, a masking formed of silicon or the like is applied to the inner surfaces of the groove main body 61 described above. Note that the masking may be applied, or need not be applied to the opening 62.

Next, the insulation film 42 is formed on the outer surface of the winding portion 41 (step S4). In this step S4, for example, the insulation film 42 is formed by immersing the winding portion 41 and the gripping portion 91 in the container in which an insulation material is stored. Alternatively, the insulation film 42 may be formed by spraying an insulation material onto the winding portion 41 by using a spray gun or the like.

Next, the above-described masking is removed from the winding portion 41 on which the insulation film 42 has been formed (step S5). That is, the masking is removed from the groove 60. As a result, the surface of a metal such as copper constituting the winding portion 41 is exposed at the inner surfaces of the groove main body 61. Subsequently, a paste or the like formed of the conductive material 45 is applied to the inner surfaces of the groove main body 61 (step S6).

Then, the winding portion 41 is compressed from both sides in the direction of the axis X (step S7). In this step S7, it is desirable to place the intermediate coil body 90 on a workbench and apply a compressive force to the intermediate coil body 90 in the direction of the axis X by gripping the gripping portions 91. As a result, the winding portion 41 is plastically deformed and the coil 22 having a spiral shape extending in a plane orthogonal to the axis X is obtained. In other words, the intermediate coil body 90 originally having a helical shape is compressed to be the coil 22 having a flat shape.

At this time, the inner surfaces of the groove main body 61 come into contact with each other due to plastic deformation. Accordingly, as described above with reference to FIG. 6, the inner surfaces of the groove main body 61 are electrically connected with each other with the conductive material 45 interposed therebetween. Then, by removing the gripping portion 91, all the processes related to the method of manufacturing the coil 22 are completed.

Operational Effects

Here, in a case where the coil 22 is formed by the three-dimensional additive manufacturing as described above, a method of simultaneously forming a conductor such as copper and the insulation film 42 such as ceramic may be considered. However, it is difficult to perform stable forming because physical property values of the conductor and the insulation film 42 are significantly different from each other. Then, increase in the thickness of the insulation layer is required for stable forming. As a result, there is a problem that the space factor of the coil 22 is decreased. For this reason, in the present embodiment, the configuration as described above is adopted.

According to the method described above, the insulation film 42 is formed on the winding portion 41 that extends so as to twist around the axis X. That is, the material constituting the insulation film 42 is applied to the outer surfaces of the winding portion 41 in a state where the outer surfaces are entirely exposed to the outside without being overlapped with each other. Thus, it is possible to avoid the possibility of excessive formation of the insulation film 42 or insufficient formation of the insulation film 42. Accordingly, the insulation film 42 can be formed to have a thin and uniform thickness. As a result, the volume ratio of the insulation film 42 to the winding portion 41 is decreased, and thus the space factor of the coil 22 can be increased. That is, the efficiency of the electric motor 1 can be further improved.

In addition, according to the method and the configuration described above, since the groove 60 is formed as the deformation allowing portion 43 in the winding portion 41, the deformation allowing portion 43 is preferentially deformed when the winding portion 41 is compressed. Accordingly, the winding portion 41 can be plastically deformed with ease. In contrast, when the deformation allowing portion 43 is not formed, it is not possible to control where plastic deformation occurs in the winding portion 41, and thus there is a possibility that the final shape of the coil 22 is non-uniform. According to the method described above, the above possibility is reduced, and the coil 22 having determinate shape and quality can be manufactured in a stable manner.

Further, according to the method and the configuration described above, the masking is applied on the inner surfaces of the groove 60 before forming the insulation film 42. Thus, the insulation material does not adhere to the inner surfaces of the groove 60 in forming the insulating film 42. Subsequently, by removing the masking, the metal surfaces are exposed at the inner surfaces. When the winding portion 41 is compressed in this state, the inner surfaces of the groove 60 come into contact with each other due to deformation. This makes it possible to ensure the electrical conductivity at the portion where the groove 60 was present. That is, it is possible to avoid deterioration in performance of the coil 22 due to the formation of the groove 60.

In addition, according to the method and the configuration described above, after the masking is removed, the conductive material 45 is applied to the inner surfaces of the groove 60. Accordingly, when the winding portion 41 is compressed and deformed, the conductive material 45 is interposed between the inner surfaces. As a result, the electrical conductivity between the inner surfaces can be further increased.

In addition, according to the method and the configuration described above, since the gripping portion 91 is formed at the intermediate coil body 90, the winding portion 41 can be easily compressed in the direction of the axis X while the gripping portion 91 is gripped with a tool or the like. This can improve workability and efficiency during manufacturing.

Further, according to the method described above, the winding portion 41 and the gripping portion 91 can be manufactured more easily and in a short period of time by using the three-dimensional additive manufacturing. This makes it possible to reduce a manufacturing cost compared to a case where a conventional manufacturing method is used.

Other Embodiments

The embodiments of the disclosure have been described above. Note that various changes and modifications can be made to the method and the configuration described above without departing from the gist of the disclosure.

Figure 8:
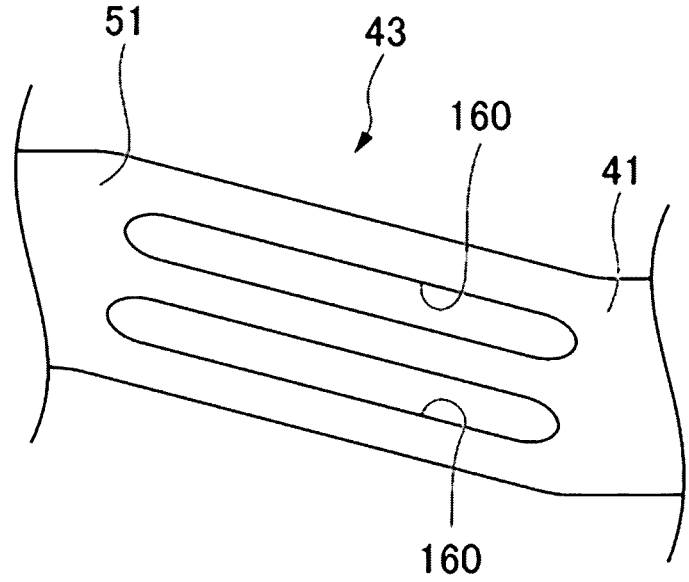
FIG. 8 is a side view illustrating a first modified example of a coil according to an embodiment of the disclosure.

For example, the above embodiment has described an example in which the groove 60 is formed as the deformation allowing portion 43. However, the aspect of the deformation allowing portion 43 is not limited to the groove 60. As in a first modified example illustrated in FIG. 8, a plurality of slits 160 may be formed as the deformation allowing portion 43. In the coil end portion 51 of the winding portion 41, each of the slits 160 penetrates through the coil end portion 51 in a direction orthogonal to the axis X and extends along the extending direction of the coil end portion 51. In addition, in the example of FIG. 8, a pair of slits 160 are formed with a spacing therebetween in the direction of the axis X. According to this configuration, it is possible to easily form the deformation allowing portion 43 only by forming the slits 160. Further, since the step of applying the above-described masking or the like is not required, the manufacturing process can be simplified.

Figure 9:
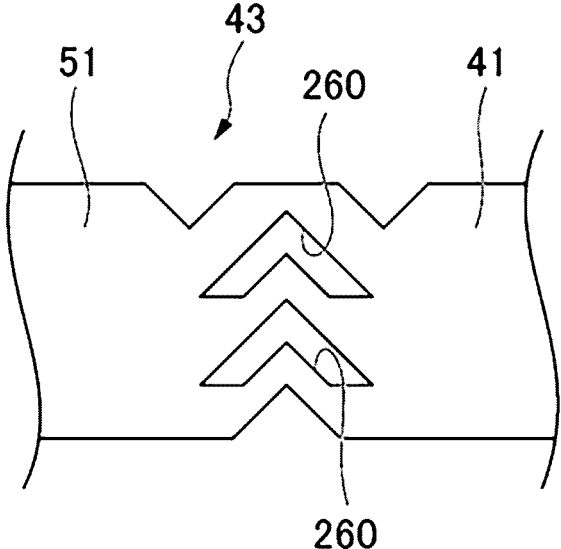
FIG. 9 is a side view illustrating a second modified example of a coil according to an embodiment of the disclosure.

Furthermore, as in a second modified example illustrated in FIG. 9, the deformation allowing portion 43 may be a through-hole 260 having a V-shape. More specifically, the through-hole 260 extends in two directions that are gradually separated from each other from a vertex on one side in the direction of the axis X toward the other side. A plurality of through-holes 260 are disposed with a spacing therebetween in the direction of the axis X. Also with this configuration, the winding portion 41 can be plastically deformed with ease.

Figure 10:
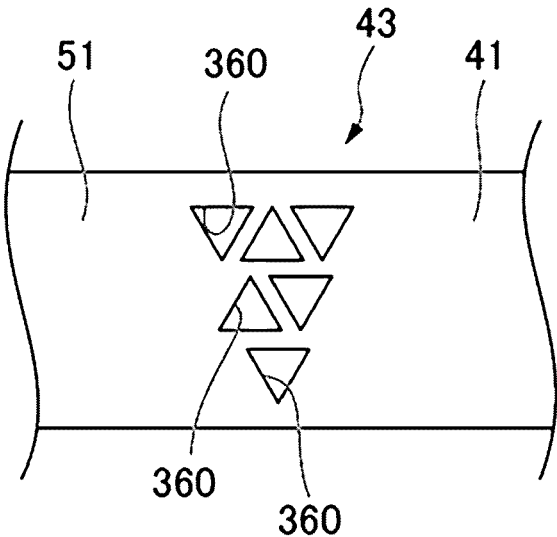
FIG. 10 is a side view illustrating a third modified example of a coil according to an embodiment of the disclosure.

Further, as in a third modified example illustrated in FIG. 10, the deformation allowing portion 43 may be a plurality of holes 360 each having a triangular shape. The holes 360 are arranged in a triangular shape as a whole in which the number of the holes 360 is gradually decreased from one side in the direction of the axis X toward the other side. That is, a side with a larger number of the holes 360 is more likely to be deformed. Also with this configuration, the winding portion 41 can be plastically deformed with ease.

Notes

The method of manufacturing the coil 22, the coil 22, and the electric motor 1 described in each of the embodiments can be understood as follows, for example.

(1) A method of manufacturing a coil 22 according to a first aspect includes: a step of forming a winding portion 41 extending twisting around an axis X along a direction of the axis X, the winding portion 41 including a portion in an extending direction of the winding portion 41, the portion being a deformation allowing portion 43 having a lower rigidity than the other portion; a step of forming an insulation film 42 on the winding portion 41 in the extending direction of the winding portion 41; and a step of compressing the winding portion 41 with the insulation film 42 formed thereon in the direction of the axis X.

According to the method described above, since the insulation film 42 is formed on the winding portion 41 that extends so as to twist around the axis X, the insulation film 42 can be formed to have a thin and uniform thickness. This can increase the space factor of the coil 22.

(2) A method of manufacturing the coil 22 according to a second aspect is the method of manufacturing the coil 22 of (1), wherein the deformation allowing portion 43 is a groove 60 extending in the direction of the axis X from an end face of the winding portion 41 facing the direction of the axis X.

According to the method described above, since the groove 60 is formed as the deformation allowing portion 43, the winding portion 41 can be plastically deformed with ease when the winding portion 41 is compressed.

(3) A method of manufacturing the coil 22 according to a third aspect is the method of manufacturing the coil 22 of (2), wherein a step of applying a masking covering the inner surfaces of the groove 60 is performed before a step of forming the insulation film 42, and a step of removing the masking is performed after the step of forming the insulation film 42.

According to the method described above, since the masking is applied to the inner surfaces of the groove 60, an insulation material constituting the insulation film 42 does not adhere to the inner surfaces. When the winding portion

41 is compressed after the masking is removed, the inner surfaces of the groove 60 come into contact with each other due to deformation. This makes it possible to ensure the electrical conductivity at the portion where the groove 60 was present.

(4) A method of manufacturing the coil 22 according to a fourth aspect is the method of manufacturing the coil 22 of (3), wherein a step of applying a conductive material 45 to the inner surfaces of the groove 60 is performed after the step of removing the masking.

According to the method described above, since the conductive material 45 is applied to the inner surfaces of the groove 60 after the masking is removed, the electrical conductivity between the inner surfaces can be further increased when the winding portion 41 is compressed and deformed.

(5) A method of manufacturing the coil 22 according to a fifth aspect is the method of manufacturing the coil 22 of (1) or (2), wherein the deformation allowing portion 43 is a slit 160 extending in the extending direction of the winding portion 41 and penetrating through the winding portion 41 in a direction orthogonal to the axis X.

According to the method described above, the winding portion 41 can be plastically deformed with ease when compressed, only by forming the slit 160 in the winding portion 41. This can reduce a machining cost.

(6) A method of manufacturing the coil 22 according to a sixth aspect is the method of manufacturing the coil 22 of (1) or (2), wherein the deformation allowing portion 43 is a plurality of holes 360 penetrating through the winding portion 41 in a direction orthogonal to the axis X.

According to the method described above, the winding portion 41 can be plastically deformed with ease when compressed, only by forming the plurality of holes 360 in the winding portion 41. This can reduce a machining cost. In addition, since a void space formed in the winding portion 41 is smaller than that in the case where the slit 160 is formed, it is possible to avoid a decrease in the space factor of the coil 22.

(7) A method of manufacturing the coil 22 according to a seventh aspect is the method of manufacturing the coil 22 of any one of (1) to (6), wherein a step of forming a gripping portions 91 protruding from the winding portion 41 in the direction of the axis X is performed after the step of forming the winding portion 41.

According to the method described above, since the gripping portion 91 is formed, the winding portion 41 can be easily compressed in the direction of the axis X while the gripping portion 91 is gripped with a tool or the like. This can improve workability during manufacturing.

(8) A method of manufacturing the coil 22 according to an eighth aspect is the method of manufacturing the coil 22 of any one of (1) to (7), wherein, in the step of forming the winding portion 41, the winding portion 41 is formed by using a three-dimensional additive manufacturing method.

According to the method described above, the winding portion 41 can be manufactured more easily and in a short period of time by using the three-dimensional additive manufacturing. This can reduce a manufacturing cost.

(9) A method of manufacturing the coil 22 according to a ninth aspect is the method of manufacturing the coil 22 of (7), wherein, in the step of forming the gripping portion 91, the gripping portion 91 is formed integrally with the winding portion 41 by using a three-dimensional additive manufacturing method.

According to the method described above, since the gripping portion 91 is also formed integrally with the winding portion 41 by the three-dimensional additive manufacturing, the time and cost required for manufacturing can be further reduced.

(10) A coil 22 according to a tenth aspect includes: a winding portion 41 having an annular shape centered on an axis X, the winding portion 41 extending toward an inner periphery side along a circumferential direction of the axis X; an insulation film 42 covering the winding portion 41 from outside; and a deformation allowing portion 43 formed at a portion of the winding portion 41 in an extending direction of the winding portion 41 and having a lower rigidity than the other portion.

According to the configuration described above, since the deformation allowing portion 43 is formed at the winding portion 41, in manufacturing the winding portion 41, the insulation film 42 can be formed in a state in which the winding portion 41 is stretched so as to have a spiral shape. Accordingly, the insulation film 42 can be formed to have a thin and uniform thickness. As a result, the space factor of the coil 22 can be increased.

(11) A coil 22 according to an eleventh aspect is the coils 22 of (10), wherein the deformation allowing portion 43 is a notch 44 extending in the direction of the axis X from a surface of the winding portion 41 facing in the direction of the axis X and a conductive material 45 filled in the notch 44.

According to the configuration described above, since the conductive material 45 is filled in the notch 44, the inner surfaces of the groove 60 required during manufacturing come in contact with each other with the conductive material 45 interposed therebetween. This makes it possible to ensure electrical conductivity of the winding portion 41.

(12) A coil 22 according to a twelfth aspect is the coil 22 of (10), wherein the deformation allowing portion 43 is a slit 160 extending in the extending direction of the winding portion 41 and penetrating through the winding portion 41 in a direction orthogonal to the axis X.

According to the configuration described above, the winding portion 41 can be plastically deformed with ease when compressed, only by forming the slit 160 in the winding portion 41. This can reduce a machining cost.

(13) A coil 22 according to a thirteenth aspect is the coil 22 of (10), wherein the deformation allowing portion 43 is a plurality of holes 360 penetrating through the winding portion 41 in a direction orthogonal to the axis X.

According to the configuration described above, the winding portion 41 can be plastically deformed with ease when compressed, only by forming the plurality of holes 360 in the winding portion 41. This can reduce a machining cost. In addition, since a void space formed in the winding portion 41 is smaller than that in the case where the slit 160 is formed, it is possible to avoid a decrease in the space factor of the coil 22.

(14) An electric motor according to a fourteenth aspect includes a rotor 10 configured to rotate about a central axis A and a stator 20 covering the rotor 10 from an outer periphery side of the rotor. The stator 20 includes: a stator core 21 including a yoke 23 having an annular shape centered on the central axis A, and a plurality of teeth 24 protruding from an inside surface of the yoke and arranged at intervals in a circumferential direction; and the coil 22 according to any one aspect of (10) to (13) attached covering outside surfaces of the teeth 24.

According to the configuration described above, by providing the coil 22 having a high space factor, it is possible to obtain the electric motor 1 having further improved efficiency.

(15) An electric motor 1 according to a fifteenth aspect is the electric motor 1 of (14), wherein the deformation allowing portion 43 is disposed at an end of the coil 22 being a portion not overlapping with the stator core 21 when viewed in a radial direction of the central axis A.

According to the configuration described above, since the deformation allowing portion 43 is disposed at the end of the coil 22, it is possible to minimize an effect on a magnetic field due to the formation of the deformation allowing portion 43 in portions other than the end of the coil 22 in which a magnetic flux density is high.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A method of manufacturing a coil, comprising:

forming a winding portion extending twisting around an axis along a direction of the axis, the winding portion having a spiral shape such that an outer dimension of the winding portion as viewed in the direction of the axis gradually decreases, the winding portion including a portion in an extending direction of the winding portion, the portion being a deformation allowing portion having a lower rigidity than other portion;

forming an insulation film on the winding portion over the extending direction of the winding portion; and compressing the winding portion on which the insulation film is formed, in the direction of the axis, such that the winding portion has a flat shape, wherein the winding portion has the spiral shape such that the outer dimension of the winding portion as viewed in the direction of the axis gradually decreases, with none of a portion of the winding portion overlapping another portion of the winding portion.

2. The method of manufacturing a coil according claim 1, wherein the deformation allowing portion is a groove extending in the direction of the axis from an end face of the winding portion facing the direction of the axis.

3. The method of manufacturing a coil according to claim 2, wherein applying a masking covering an inner surface of the groove is performed before the forming the insulation film, and removing the masking is performed after the forming the insulation film.

4. The method of manufacturing a coil according to claim 3, wherein applying a conductive material to the inner surface of the groove is performed after the removing the masking.

5. The method of manufacturing a coil according to claim 1, wherein the deformation allowing portion is a slit extending in the extending direction of the winding portion and penetrating through the winding portion in a direction orthogonal to the axis.

6. The method of manufacturing a coil according claim 1, wherein the deformation allowing portion is a plurality of holes penetrating through the winding portion in a direction orthogonal to the axis.

7. The method of manufacturing a coil according to claim 1, wherein forming a gripping portion protruding from the winding portion in the direction of the axis is performed after the forming the winding portion.

8. The method of manufacturing a coil according to claim 7, wherein, in the forming the gripping portion, the gripping portion is formed integrally with the winding portion by using a three-dimensional additive manufacturing method.

9. A coil comprising:

a winding portion having an annular shape centered on an axis, the winding portion extending toward an inner periphery side along a circumferential direction of the axis, the winding portion having a flat shape;

an insulation film covering the winding portion from outside; and a deformation allowing portion formed at a portion of the winding portion in an extending direction of the winding portion and having a lower rigidity than the other portion, wherein the winding portion has a spiral shape such that an outer dimension of the winding portion as viewed in the direction of the axis gradually decreases, with none of a portion of the winding portion overlapping another portion of the winding portion.

10. The coil according to claim 9, wherein the deformation allowing portion is a notch extending in the direction of the axis from an end face of the winding portion facing the direction of the axis.

11. The coil according to claim 9, wherein the deformation allowing portion is a slit extending in the extending direction of the winding portion and penetrating through the winding portion in a direction orthogonal to the axis.

12. The coil according to claim 9, wherein the deformation allowing portion is a plurality of holes penetrating through the winding portion in a direction orthogonal to the axis.

13. An electric motor comprising:

a rotor configured to rotate about a central axis; and a stator covering the rotor from an outer periphery side of the rotor, wherein the stator including a stator core including a yoke having an annular shape centered on the central axis, and a plurality of teeth protruding from an inside surface of the yoke and arranged at intervals in a circumferential direction, and the coil according to claim 9, the coil being attached covering outside surfaces of the teeth.

* * * * *